106. COMPOSITIONS, COATING OR PLASTIC 98

Cross Reference

EXAMINER

Patented Oct. 11, 1927.

1,644,964

UNITED STATES PATENT OFFICE.

HARRY V. WELCH, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

WATERPROOF CEMENT.

No Drawing. Application filed February 26, 1924. Serial No. 695,220.

This invention relates to the production of Portland cement and particularly a hydraulic cement or concrete made therefrom which will have certain advantageous properties, particularly a greater degree of plasticity than is present in ordinary Portland cement concrete or plaster and also a greater resistance to adsorption of water or passage of water therethrough.

I have discovered that a composition containing diatomaceous earth or infusorial earth with bituminous, oily or hydro-carbon material may be used advantageously as an addition to Portland cement for the purpose of rendering the concrete or plaster made therefrom more plastic and more waterproof.

The composition used in my invention may comprise or consist of a naturally occurring diatomaceous or infusorial earth or shale consisting mainly of diatomite or similar material together with bituminous matter or oily matter. Such a diatomaceous shale is found for example at or near Casmalia, California, and has approximately the follow composition:

| | Per cent. |
|---|---|
| Loss on ignition | 27.67 |
| Silica | 53.75 |
| Iron oxide and alumina | 14.45 |
| Calcium oxide | 0.99 |
| Magnesium oxide | 1.17 |

In addition to diatomite and bituminous material the composition may include more or less clay or argillaceous material occurring for example naturally with the diatomaceous earth and may also include more or less lime or magnesia either occurring naturally with the diatomaceous earth or added thereto.

As an example of one method of manufacture of the improved composition a naturally occurring oil bearing or bituminous diatomaceous earth of approximately the composition above set forth may be reduced by crushing and grinding to a suitable state of division for example one fourth inch mesh or finer, and then added to cement clinker and ground therewith to produce a cement of the usual fineness for Portland cement. Or the oil bearing diatomaceous earth or diatomaceous shale may be ground in the first place to suitable fineness, say 200 mesh or finer, and then mixed with the ground Portland cement.

The amount of plasticizing composition added to the Portland cement clinker or to the Portland cement will depend on the results desired and on the use to which the cement or concrete is to be put. For use as a water proof plaster it may be desirable to use one part of the water-proofing and plasticizing material to ten to twenty parts of Portland cement clinker or of Portland cement as the case may be. In connection with the composition above described I may add any other suitable constituents either by way of dilution or for the purpose of modifying the effect of the composition in any way, for example, for modifying either the drying, or the primary or secondary set as may be desired, provided that the above described ingredients are used in sufficient proportions to produce substantially the same effect as the stated composition.

The term diatomaceous earth as herein used is intended to include not only diatomite so-called, but any diatomaceous or infusorial earth containing or including as a major constituent diatomaceous or infusorial material irrespective of the presence of other constituents such as shale, limestone, magnesia, etc., occurring naturally with the diatomaceous or infusorial material or added thereto, provided that the material is essentially of diatomaceous nature, that is to say, consists mainly of diatomaceous earth.

The modifying agent used for retarding or controlling the drying of the water-proofing composition of the cement made therewith or for retarding or controlling the setting of the cement may consist of or comprise chloride, fluoride, sulphate, silicate or fluosilicate of magnesium, calcium, or zinc, and such agent may be used in proportion of one to ten parts of the modifying agent per one hundred parts of the mixture of diatomaceous earth and bituminous or oily material.

What I claim is:

1. A composition comprising Portland cement and a waterproofing material in the proportion of 1 part of waterproofing material to 10 to 20 parts Portland cement, said waterproofing material including diatomaceous earth and hydrocarbon naturally occurring therewith.

2. A composition comprising Portland cement and a waterproofing material in the proportion of 1 part waterproofing material to 10 to 20 parts Portland cement, said waterproofing material consisting of oil-bearing diatomaceous material.

3. A composition comprising Portland cement and a waterproofing material interground therewith in the proportion of 1 part waterproofing material to 10 to 20 parts of Portland cement, said waterproofing material consisting of oil-bearing diatomaceous earth.

In testimony whereof I have hereunto subscribed my name this 20th day of February 1924.

HARRY V. WELCH.